Aug. 11, 1936.  J. F. WAIT  2,050,771
PROCESS AND APPARATUS FOR OZONATION
Filed April 18, 1933
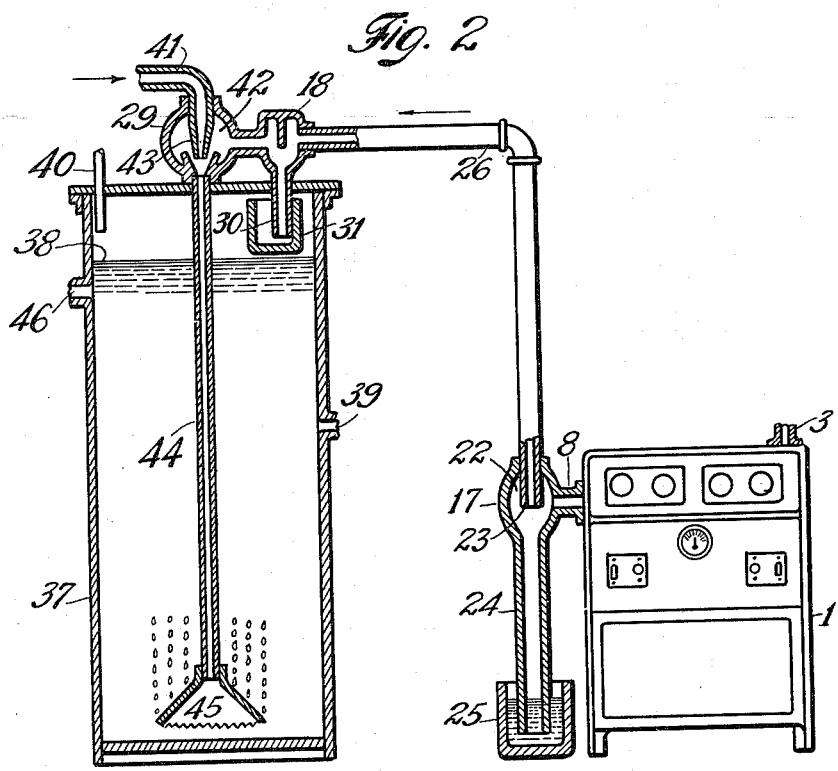
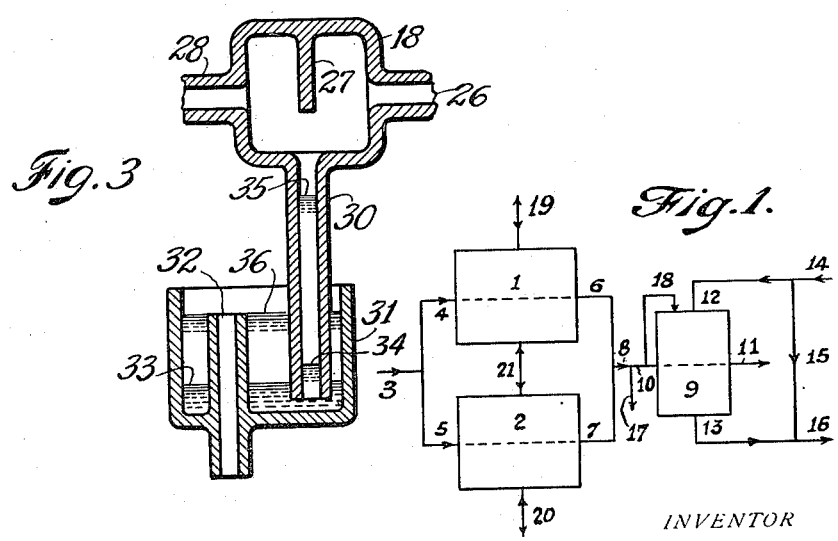
INVENTOR
Justin F. Wait Patented Aug. 11, 1936

2,050,771

UNITED STATES PATENT OFFICE 2,050,771

PROCESS AND APPARATUS FOR OZONATION

Justin F. Wait, New York, N. Y.

Application April 18, 1933, Serial No. 666,711

4 Claims. (Cl. 204—32)

This invention relates to improvements in the method of treating liquid by gaseous fluid which has been treated by electric discharge and to apparatus therefor. It pertains particularly to improvements in apparatus for and method of treating water and other liquids by means of ozone formed by brush discharge. This application is a continuation in part of Ser. No. 429,905 filed February 20, 1930, which matured into Patent No. 1,907,691 and is further a continuation in part of or related to Ser. No. 294,141 filed July 20, 1928, Ser. No. 616,071 filed June 8, 1932, and Ser. No. 642,380 filed November 12, 1932. It is further related to another application filed as of even date.

The treatment of gaseous fluid by electrical discharge and application of the treated fluid to a liquid has long been recognized as a means for promoting alteration of a component of such liquid. For treating aqueous solution or materials wet with water ozone has been employed over a period of years. As an example, potable water has been so formed or treated.

Prior applications have permitted of the existence of conditions resulting of high maintenance costs or otherwise reduced the convenience, the permanence, the continuity or the efficiency of operation. One of the deficiencies of prior applications has been the failure to provide positive means of preventing liquid from forming in or flowing into the region of discharge. Liquid has been introduced by such means as direct flow or by splashing or by flow of entrained particles or by condensation. Condensation has been especially predominant or noticeable where water or other intensive cooling has been used as by water jackets about the discharge zone.

With systems involving the aspirator or liquid injector principle, reduced pressure is applied to the gaseous discharge line from the region of discharge. At the time of cessation of the liquid flow the reduced pressure at or near the zone often causes back flow of liquid from the injector particularly where the injector is at the top of a long column normally carrying gas and liquid in admixture. As a result, liquid is splashed, sucked or otherwise passed into the discharge zone and damage frequently results.

I have found that one or more indicated ailments may be remedied by special construction as by special chambers and connections. These have proven to be reliable and have not failed after a period of years in which they have been studied, closely inspected, experimented with and otherwise held under close observation. The time has been sufficient to demonstrate elimination of all possibility of a multiplicity of events taking place at a given instance and the combination overcoming the intended usefulness.

My invention is applicable to treatment of liquids such as oils with oxide of nitrogen formed by spark discharge through nitrogen and oxygen, or for treatment with hydrogen or fixed gases activated by discharge or for other similar purposes. For purposes of discussion and illustration this specification will be devoted mainly to application of treated air to water purification but I do not limit my claims to this nor to the particular method or form of equipment illustrated.

The method of applying ozone is an important factor as it must be intimately contacted with the water to be treated. Methods involving high pressures may be used with reasonable success, but they involve unnecessary inconvenience and high costs. I have developed a method of mixing which is suitable for receiving an ozone-air mixture and mixing it with water to be treated and which can be operated with but little pressure loss. I have found it advantageous to form a thoroughly mixed mass and to place and keep such a mixture under appreciable pressure and to break successively the air masses containing the ozone into small portions, agglomerating the same and again breaking the same into small portions while contacting the small portions of air with water.

The strength of the ozone and the time of contact influence the physical properties of the impurities remaining after ozonation. I have found it desirable to first treat the water with air containing ozone of low concentration and to subsequently treat the then partially purified water with air containing ozone of higher concentration. This gives improved results which may be residual suspended portions which are more easily filtered. To accomplish this I have devised a system of countercurrent flow which brings the air of low zone concentration into contact with water at greater pressure than that at which the high ozone concentration is applied.

This control of concentration and pressure has enabled me to accomplish the desired pretreatment with very low ozone consumption and with a very low time factor. In former tests and applications from about three to ten minutes have usually been needed for the contact, but I have been able to accomplish very satisfactory results with my invention within about one minute and fair results within one-tenth of a minute.

Ozone is an unstable form of oxygen and under the conditions described is almost completely decomposed within about an hour. Within two minutes a large amount of the ozone has been dissipated or reverted back to oxygen, a stable substance. By quickly treating the water as above described, the desired reactions are brought about with less consumption of ozone. This is due in part to the short time element and hence less decomposition of ozone during the treating stage.

I have further found that it is possible to treat water with an excess of ozone and, by controlling the time element I can use the excess ozone to treat other water by mixing water containing excess ozone with the other water to be treated. To accomplish economical operation, such mixing is preferably carried out within less than about one minute of the addition of the last portion of ozone to the first portion of the water. To simplify operation, it is desirable to release portions of the air or other gas associated with the ozone in treating the first portion and to do so preferably before mixing with the second portion.

By my method of overtreating or heavily treating a portion of the water and mixing the so treated water with other water to be treated, I am able to promote reaction of ozone on stubborn bacteria or other organic or other matter. For example if two parts per million is desirable for average treatment I prefer to introduce from about four to about ten parts per million at one zone and then to mix other water therewith to yield the desired average of two. I generally prefer the higher strengths obtainable by treating about half and preferably about a quarter or less of the water with the ozone at one zone thus permitting of treatment of high intensity at that zone and with assurance that substantially all of the water will intermittently be so treated and that it will be treated at an average lower concentration at all times. This thus gives what I term reaction assurance as regards treatment at high ozone intensity. Such assurance especially as combined with mechanical assurance yields results previously unattainable.

The arrangement is schematically illustrated in Fig. 1. An ozone generator 1 is shown performing with a second ozone generator 2. Air from a dehydrating unit is shown as being introduced by line 3 with branches 4 and 5. The ozonated air is discharged as through lines 6 and 7 connecting to form line 8. An ozone mixer or contact zone 9 is provided with ozone inlet 10 and vent 11. Water is introduced by inlet 12 and is discharged as by outlet 13. A portion of the flowing water from main 14 may flow as through bypass 15 to return or discharge main 16.

A special member 17 is provided to prevent water of 9 from passing into generators 1 and 2. This member permits of escapage of water such as is sucked back or which may be forced back in case an obstruction occurs within 9 or its outlet or to guard against other mal operation. A special member illustrated schematically as 18 is preferably provided so that water may be returned into vessel or zone 9. Prior apparatus has been provided with check valves or the like in the line at 8 or at 10 supposedly for the purpose of protecting the ozone generator. I have found that such check valve fails to close tightly or else it cannot be opened except with high pressure. A check valve may operate for a while but invariably fails eventually unless removed often for cleaning or replacement.

Electrical safeguard is preferably provided by connecting two discharge zones in series. Thus if the dielectric of one fails, that of the other presents an obstruction or resistance to heavy current flow. In Fig. 1, this is shown schematically by connections or bars 19 and 20 to which is applied an alternating or a pulsating current of appropriate frequency and voltage. A connection 21 between ozone generators 1 and 2 permits of the series connection. Such connection may be within either 1 or 2 or within both. The generators 1 and 2 may be contained within a single housing or chamber.

A simple form of apparatus is illustrated in Fig. 2. An ozone generator 1 is shown with an air inlet 3 and an outlet 8. The safety discharge member 17 is illustrated as having an enlarged chamber 22 with a protruding inlet 23 and an outlet 24 the lower end of which is in a seal 25 containing liquid as indicated. Line 26 connects with the aspirator system or parts. Water or other liquid sucked or flowed towards the ozone generator 1 will be separated from gases in chamber 22 and flow downward through line 24 to seal pot 25 whereat it may be spilled or disposed of. The diameter of pot 25 is a couple or a few times that of pipe 24 so that when vacuum is applied in chamber 22 the water will rise in pipe 24 but the seal will not be broken. The vacuum is generally about a foot or a few feet of water. If more the seal may contain mercury.

A second safety member 18 is preferably provided as indicated in Fig. 2 and in detail in Fig. 3. The member provides for the chamber within 18 preferably containing a baffled means 27 to prevent direct passage between line 26 connecting to the ozone generator 1 and the line 28 connecting with the injector 29 or other means of contact of ozone and liquid. Means 27 is provided with a liquid outlet 30 leading into a vessel 31 which may be provided with an overflow such as 32. In my preferred arrangement I place mercury or a suitable fluid metallic alloy in vessel 31 to yield a level such as 33. With reduced pressure in chamber 18 the mercury or other level may ride at level 34. The level with mercury is about one or a few inches corresponding to the one or a few feet of water. Water and the metal coact in sealing. Collected water accumulates in line 30 until some such level as 35 is reached the result being to cause water to "bubble" from the lower end of 30 to form surface 36 and overflow through 32. The length of 30, the submersion of the lower end, the depth of liquid(s) and such factors are provided so as to insure continuity of operation and to prevent appreciable amounts of liquid from flowing from line 28 into line 26. This arrangement may be placed as within a contact tower or zone 37 containing treated liquid at some such level as 38 so held as by means attached to liquid outlet 39 and gaseous outlet 40. Vessel 37 is preferably made right to withstand other than atmospheric pressure.

The inlet for water or other liquid is shown as line 41 leading into chamber 42 of shell 29. The aspirator effect is obtained by means of nozzle 43 and the channel at 44 by well known means. The gas and liquid is shown as passing through line 44 to distributor 45 which has regular notches at the bottom and holes on the slope preferably of about 3/64th inch in size the sloping being of about one sixteenth of an inch in thickness. The bypassed water may enter as indicated at 46.

The injector or mixing member is preferably not as simple as shown but in multiple with the gases flowing in series therethrough, the partially obstructed gas being contacted with water of higher pressure. The fresh gas is preferably contacted with liquid of low or lowest pressure in the multiplicity of aspirator zones. The gas is preferably dispersed and agglomerated in three or more stages in countercurrent flow as to the general passage from stage to stage. In such manner the vented air used for ozonating water may be freed from marked odor of ozone as is noticeable by ordinary methods. Details of such preferred contact arrangement is illustrated as Figs. 3 and 4 of Patent No. 1,907,691.

A characteristic of gases from a discharge zone is the change therein which occurs almost immediately upon leaving the zone of discharge. It is considered essential therefore that the contact of the gases and liquid, or gaseous fluid which may also be so treated, be made within a fraction of a minute. With ozone and water and like applications a relatively small portion of the liquid is treated at high concentration and the main or other portion then treated as by application of the so formed unstable solution to the remaining portion of water to be treated. This second contact should be within about a second or so at least as to the main part of the portions involved. A small portion of reaction may continue up to a period of about ten minutes as in the case of ozone and water.

The ozone generators, especially when in the indicated multiple operation are preferably provided with means to simultaneously stop the discharge and change the passage of flow of gas as previously indicated. By this means undesired dilution or mal operation is preventable.

The visibility of flow from the protective seal is considered as being quite essential. If flow occurs indication is had of a temporary or other defect that requires correction. If a second seal such as one of mercury is used it may normally be expected to function at times or regularly to a greater or less degree however I consider the second seal as a special device to warn the operator that something is wrong. The arrangement is preferably such as to provide free flow of gases at all times. Where a baffle is used the passageway is preferably enlarged as indicated so that there is no material obstruction to flow and so that water may be readily settled or flowed out.

In instances I have found it desirable to install one seal without connected discharge means or with one which will spill the water on the floor close the ozone generator such spillage being excellent as a warning.

I do not limit my claims to the exact means illustrated. Other equivalent means may be provided.

I claim:

1. In apparatus for contacting ozone with water by means of an injector-like device, the combination of a water seal with visible water discharge and a mercury seal with means for discharging water through sealing mercury and to a region beyond in the line between the ozone generator and the contact zone of ozone and water contained within the injector-like device.

2. In an ozonating device protective means for separating and discharging water from gas adapted to prevent flow of liquid through a line connecting an ozone generator with an ozone mixer comprised of an injector-like device while permitting the passage of gas therethrough, the combination of an enlargement in the line, a drain therefrom to a seal of mercury and means to flow water from the enlargement through the mercury and to a point beyond the seal.

3. In apparatus of the kind described for preventing water of an injector from backing up into an ozone generator, the combination of two enlarged zones in the connecting line between the ozone generator and the injector, structural means within each zone for charging the direction of flow and drain means in each, one leading to a mercury seal adapted to discharge water and the other leading to a water seal with visible discharge.

4. In means for protecting an ozone generator from damage by treated water, the combination of a fluid metal seal and a water seal connecting with enlargements in the gas line from the generator to the treating zone with a free passageway from the generator to the zone and a visible discharge from the water seal located between the metal seal and the generator and which seal is of high capacity and free flowing and will operate when the first seal is inoperative as regards separation and removal of substantially all of the water of the gas.

JUSTIN F. WAIT.